US006060226A

United States Patent [19]

Hashimoto

[11] Patent Number: 6,060,226

[45] Date of Patent: May 9, 2000

[54] POLYESTER SUPPORT

[75] Inventor: Kiyokazu Hashimoto, Minami-ashigara, Japan

[73] Assignee: Fuji Photo Film Photo, Co., Ltd., Minami-ashigara, Japan

[21] Appl. No.: 09/188,187

[22] Filed: Nov. 10, 1998

[30] Foreign Application Priority Data

Nov. 11, 1997 [JP] Japan .................................... 308918

[51] Int. Cl.[7] ......................... G03C 1/765; G03C 1/795; G03C 11/22; B32B 27/06; B32B 27/36

[52] U.S. Cl. ......................... 430/496; 430/349; 430/533; 264/288.8; 264/290.2; 428/156; 428/172; 428/220; 428/480

[58] Field of Search .................................. 430/349, 533, 430/496; 428/156, 172, 220, 480; 264/288.8, 290.2

[56] References Cited

U.S. PATENT DOCUMENTS

| | | | |
|---|---|---|---|
| 2,779,684 | 1/1957 | Alles | 430/533 |
| 5,914,220 | 6/1999 | Murayama et al. | 430/533 |

FOREIGN PATENT DOCUMENTS 54-158470A 12/1979 Japan .

*Primary Examiner*—Richard L. Schilling

*Attorney, Agent, or Firm*—Birch, Stewart, Kolasch & Birch, LLP

[57] ABSTRACT

There is disclosed a polyester support which has a flatness index of from 0.01 to 0.07, which is defined by the following formula: Flatness index=(the average value of ΔL in the transverse direction)×(ΔL range), in which ΔL (%)=100×[(longitudinal direction size at 150° C.)−(longitudinal direction size at 30° C.)]/(longitudinal direction size at 30° C.), and ΔL range (%)=[(maximum value of ΔL in the transverse direction)−(minimum value of ΔL in the transverse direction). The polyester support is excellent in flatness and heat-dimensional stability.

18 Claims, 1 Drawing Sheet

POLYESTER SUPPORT

FIELD OF THE INVENTION

The present invention relates to a polyester support having excellent flatness and thermal dimensional stability.

BACKGROUND OF THE INVENTION

Hitherto, for a photographic light-sensitive material, a wet development has been applied using a developing solution after photographing. However, the method has the following inconveniences, and improvement has been desired.

[1] Because development, bleaching, fixing, and drying are carried out, a long time is required for the development processing.

[2] Because plural tanks containing a developing solution are required, a processor cannot be made small in size and light in weight.

[3] Inconveniences, such as the replenishment of a developing solution, the disposal of processing liquids, washing of developing tanks, etc., are required.

For improvement thereof, photographic light-sensitive materials that are processed using a development method by heating (hereinafter, occasionally referred to as "heat development") to a temperature of from 80 to 150° C. are proposed, as described in, for example, U.S. Pat. No. 3,152,904, U.S. Pat. No. 3,457,075, JP-B-43-4921 ("JP-B" means an examined Japanese patent publication), and JP-B-43-4924. One example is a method of previously incorporating a precursor for a developing agent in a light-sensitive layer, decomposing the precursor by heating, to form a developing agent, and subjecting to development. In such a heat-developing system, the development processing may be carried out by only applying heat, whereby the processing can be carried out in a short time and a processor can be small in size. Furthermore, there are no inconveniences with the replenishment and the disposal of a developing solution.

However, when the light-sensitive material of this system was applied to a printing light-sensitive material, when 4 plates (blue, green, red, and black plates) were piled up, there was a problem that color discrepancies were caused by the dimensional change that occurs during the heat development. To solve the problem, a method of heat treating under a low tension is known hitherto, as described, for example, in JP-A-60-22616 ("JP-A" means unexamined published Japanese patent application), JP-A-64-64883, JP-A-54-158470, and U.S. Pat. No. 2,779,684. By conducting the low-tension heat treatment to a support, the dimensional change between before and after the heat development could be reduced, but accompanying the heat treatment, inferior flatness (slackening in the middle of a support, and undulation) occurred. This is a large problem for a photographic support that is required to have high flatness.

SUMMARY OF THE INVENTION

An object of the present invention is to provide a polyester support having excellent flatness and thermal dimensional stability.

Other and further objects, features, and advantages of the invention will appear more fully from the following description, taken in connection with the accompanying drawing.

DETAILED DESCRIPTION OF THE INVENTION

Figure 1:
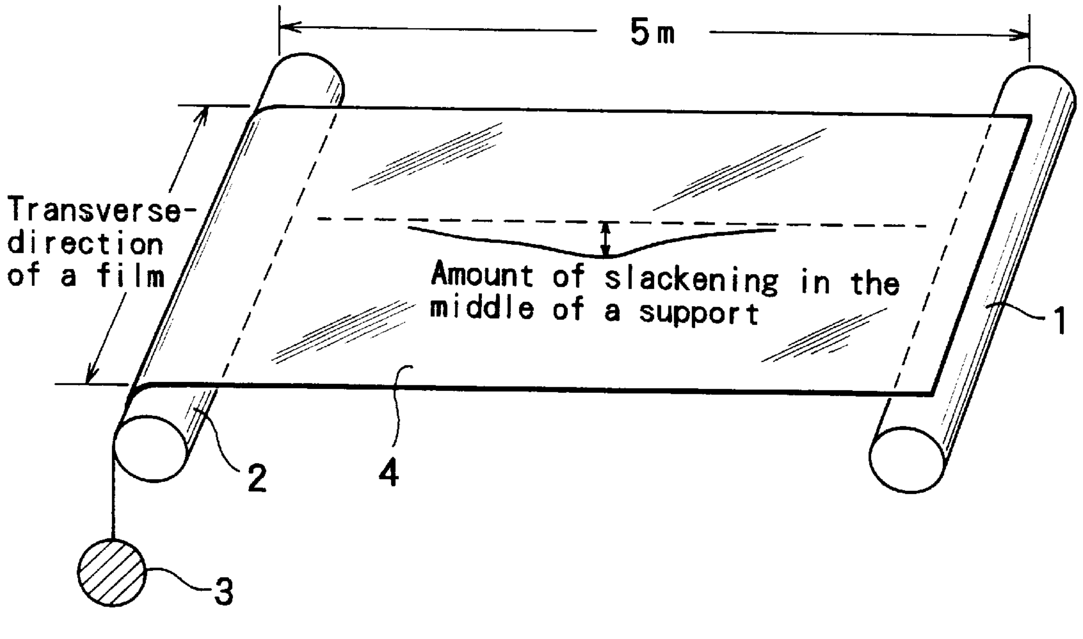
FIG. 1 shows a method of measuring an amount (degree) of the slackening in the middle of a support in the present invention.

The above-mentioned object has been attained by the polyester support as described below, and by a silver halide photographic light-sensitive material using the support.

That is, according to the present invention there is provided:

(1) A polyester support, which has a flatness index of from 0.01 to 0.07, which is defined by the following formula:

$$\text{Flatness index}=(\text{the average value of } \Delta L \text{ in the transverse (widthwise) direction})\times(\Delta L \text{ range})$$

in which

ΔL (%)=100×[(longitudinal direction size at 150° C.)−(longitudinal direction size at 30° C.)]/(longitudinal direction size at 30° C.), and ΔL range (%)=(maximum value of ΔL in the transverse direction)−(minimum value of ΔL in the transverse direction);

(2) The polyester support as stated in the above (1), wherein ΔL as defined by the formula described below, is from 0.1% to 0.6%:

ΔL (%)=100×[(longitudinal direction size at 150° C.)−(longitudinal direction size at 30° C.)]/(longitudinal direction size at 30° C.);

(3) The polyester support as stated in the above (1) or (2), wherein the height of undulation is from 0 mm to 25 mm;

(4) The polyester support as stated in the above (1) or (2), wherein the amount of a slackening in the middle of the support is from 0 mm to 50 mm;

(5) The polyester support as stated in one of the above (1) to (4), wherein the percentage of thermal dimensional change at 120° C. is from −0.05% to 0.05%, both in the longitudinal direction and in the transverse direction;

(6) The polyester support as stated in one of the above (1) to (5), wherein a difference (range) between the maximum value and the minimum value obtained by measuring, in the transverse direction, the percentage of thermal dimensional change at 120° C., both in the longitudinal direction and in the transverse direction, is from 0% to 0.03%, both in the longitudinal direction and in the transverse direction;

(7) The polyester support as stated in one of the above (1) to (6), wherein the polyester is made of polyethylene terephthalate; and (8) A silver halide photographic light-sensitive material, comprising the polyester support stated in one of the above (1) to (7).

The present invention has been accomplished based on the discovery that the flatness fault, i.e., the slackening in the middle of a support and the undulation, is caused by unevenness of the dimensional change in a polyester support. That is, the term "the slackening in the middle" means the state that the length at the central portion of the polyester support is longer than the side edge portion thereof in the width direction. Consequently, the slackening arises in the central portion, and when the polyester support is horizontally spread, the central portion forms a concave. On the other hand, the term "undulation" means the state that the length of the side edge portion is longer than the central portion. As a result, the support becomes wavy in order to absorb a stretch of the side edge portion.

These defects of the slackening in the middle and the undulation tend to arise after the low-tension heat treatment that is conducted in order to minimize the thermal dimensional change. This is because unevenness of the dimensions arises due to shrinkage caused by heat treatment. When the tension is strong, a support is evenly stretched by the tension, so that the flatness defect hardly occurs. However, the stretched portion is shrunk at the time of heat development, which results in an enlarged dimensional change (thermal dimensional change). On the other hand, when the heat treatment is carried out under a low tension, the thermal dimensional change is small. However, the flatness is easily deteriorated because it is difficult to even off the unevenness of dimensions.

According to the present invention, the flatness defect can be eliminated by setting the flatness index defined as described above, in the range of from 0.01 to 0.07.

First, the support is required to not shrink at 150° C., in order to satisfy the condition that the flatness index thereof must fall in the range according to the present invention. Since the polyester support is generally formed by biaxial or more multiaxial orientation oriented at least in the longitudinal direction and in the transverse direction, shrinkage occurs to recover the strain of the stretch at 150° C., which is higher than the stretch temperature. Preferably, the shrinkage should be as small as possible, because the flatness is deteriorated at the time of the shrinkage. On the other hand, the polyester support tends to expand thermally (linear expansion) accompanying the elevation of temperature. Therefore, the dimensions of the polyester support at 150° C. are determined by a difference between extension due to the thermal expansion and shrinkage due to the heat shrinkage. Accordingly, with respect to the support whose heat shrinkage is large, the degree of shrinkage is larger than extension at 140° C., and consequently ΔL results in a negative value. Such a polyester support whose heat shrinkage is large is not preferred, because its thermal dimensional change is large. Accordingly, a support whose ΔL is larger is more preferred. However, when the amount of shrinkage is zero, only a thermal expansion of the polyester support occurs, so that an upper limit exists. Consequently, ΔL is preferably from 0.10 to 0.60%, more preferably from 0.15 to 0.55%, and further preferably from 0.25 to 0.50%.

On the other hand, the width direction distribution of ΔL (ΔL range) being small rather than large, indicates that a heat treatment has been performed uniformly in the overall width. As a result, the flatness defect due to unevenness of the dimension in the width direction is improved by the small ΔL range. Thus, the present invention is characterized by a new finding that the unevenness of the percentage of dimensional change at 150° C. (magnitude of the range) reflects the flatness. However, such a support is accompanied by sufficiently conducting a heat treatment, and by making a structural distribution, such as a bowing, equal. Therefore, the polyester support whose ΔL range is too small is not preferred, because defects (deposition of oligomer, and deterioration of transparency due to yellowing of the support) occurs, accompanying heat treatment. Accordingly, an optimum range also exists for the ΔL range.

Consequently, the flatness of a support is improved when (the average value of ΔL in the width direction) multiplied by [ΔL (range)], i.e. the flatness index, falls in a prescribed range. The flatness index according to the present invention is generally from 0.01 to 0.07, preferably from 0.015 to 0.06, and more preferably from 0.02 to 0.05. Exceeding the above broadest range is not preferred, because deterioration of the flatness, or transparency, arises.

The height of the undulation of the support having the flatness index according to the present invention is preferably from 0 mm to 25 mm, more preferably from 0 mm to 10 mm, and further preferably from 0 mm to 2 mm. The slackening in the middle of the support is preferably from 0 mm to 50 mm, more preferably from 0 mm to 40 mm, and further preferably from 0 mm to 30 mm.

Thus, the polyester support having a dimensional evenness in the width direction provides a sufficiently small percentage of thermal dimensional change, and also a sufficiently small average value of the difference (range) between the maximum value and the minimum value. Accordingly, the former is preferably from −0.05% to 0.05%, more preferably from −0.04% to 0.045%, and further preferably from −0.03% to 0.04%, with respect to both the longitudinal direction (MD) and the width direction (TD). The range of the latter is preferably from 0% to 0.03%, more preferably from 0% to 0.02%, and further preferably from 0% to 0.015%, with respect to both MD and TD.

The support having such a flatness index is obtained by a method in which a heat treatment under a low tension is applied to the support produced by offsetting the center of a raw film (raw yard good film) at the time of film-formation (film-formation center), and then slitting the same, i.e. by offset-cutting (asymmetrically slitting with respect to the film-formation center). That is, such a support can be attained by shifting the center at the time of a heat treatment (heat-treatment center) from the film-formation center. This can be explained by the following reasons. That is, in the steps of thermal fixation to relaxation at the time of film-formation, both the side edge portions that are fixed with chucks cannot be so relaxed that heat shrinkage easily occurs. These portions shrink during the heat treatment. On the other hand, the film-formation center shrinks in a small amount during the heat treatment, because the same sufficiently relaxes at the time of film-formation. Thus, the heat shrinkage differs in the width direction (bowing). Such a support has a tendency for the film-formation center to easily slacken during the heat treatment, as compared to both of the side edge portions. Such a slackening causes unevenness with respect to tension, and/or temperature applied during the heat treatment.

In order to prevent these problems, it is effective to shift the heat-treatment center from the film-formation center. That is, when the film-formation center having the largest slackening becomes the heat-treatment center, the slackening is largest. However, the slackening can be minimized by shifting the heat-treatment center from the film-formation center, so that the unevenness of the heat treatment can be minimized. Such a slackening is especially remarkable when the heat treatment is carried out under a low tension, as performed in the present invention.

A preferable difference between the film-formation center and the heat treatment center [Offset amount (%)=100× (a distance between the film-formation center and the heat treatment center)/(a film-formation raw film width] is preferably from 3 to 45%, more preferably from 5 to 40%, and further preferably from 8 to 35%. Such a heat treatment can be easily accomplished by slitting a raw film after obtained by the film-formation.

Preferably, the polyester support of the present invention comprises an aromatic polyester that is formed by a dicarbonic acid, at least 50 mole % of which is an aromatic dicarbonic acid. More specific examples include polyethylene terephthalate-series polymers, polyethylene naphthalate-series polymers, polybutylene terephthalate-series polymers, and polybutylene naphthalate-series polymers. Among these polymers, polyethylene terephthalates and polyethylene naphthalates are more preferred. The average molecular weight (Mw) of these polyesters is preferably from 5,000 to 1,000,000, and more preferably from 10,000 to 300,000.

Preferably, these polyester supports are manufactured by biaxial or more multiaxial film-formation. For example, a polyester is melted at a temperature between a melting point (Tm) and Tm+50° C., and then it is extruded toward a cooling drum at a temperature between the glass transition temperature (Tg)−50° C. and Tg+20°C., to form an unstretched sheet. Preferably, static electricity is also impressed to the cooling drum at this time. This unstretched sheet is stretched lengthwise to the extent of 2–4 times at a temperature between Tg and Tg+60° C., and it is further stretched crosswise to the extent of 2–5 times at a temperature between Tg and Tg+60° C. This stretched sheet is subjected to thermal fixation at a temperature between Tm−60° C. and Tm for a time period of 5 seconds to 1 minute. After that, preferably, relaxation (0 to 10%) is carried out, at least once, both lengthwise and crosswise, at a temperature of Tm−60° C. and Tm. After that, preferably, the resulting sheet is further stretched again, both lengthwise and crosswise. The thickness of the thus-obtained polyester support is preferably from 50 to 500 μm, more preferably from 70 to 300 μm, and further preferably from 90 to 200 μm. The width of the thus-produced film is preferably from 0.6 m to 10 m, more preferably from 0.8 m to 8 m, and further preferably from 1.0 m to 7 m. The thus-formed film support is slitted for a low-heat shrinkage treatment. The width of the slit is preferably from 0.5 m to 8 m, more preferably from 0.7 to 6 m, and further preferably from 0.9 m to 5 m. After slitting, preferably, knurl working (emboss processing) is applied to both side edge portions.

In the production of the polyester support of the present invention, the heat treatment under a low tension is carried out while the support is transported in a heat treatment zone. The heat treatment temperature is preferably from 120° C. to 220° C., more preferably from 135° C. to 200° C., and further preferably from 145° C. to 180° C. Exceeding the above-mentioned temperature ranges is not preferred, because oligomers contained in a thermoplastic film deposit on a surface thereof, which tends to increase haze. Likewise, lowering the above-mentioned temperature range is not preferred, because the heat shrinkage increases. Such a temperature control may be performed by a method of blowing hot wind into a heat treatment zone in which a heat insulating material is used, by a method of temperature-up of a thermoplastic film by heat transfer in contact with a high temperature heat medium, such as a heat roll; or by a method of temperature-up of a thermoplastic film by radiation heat using such a tool as an infrared ray heater. Any of the above-mentioned methods may be used. However, reduction of the temperature distribution in the width direction is preferred for reduction of the heat shrinkage distribution in the width direction. This can be accomplished by setting a fin at the outlet of hot wind, to regulate the wind direction, thereby removing wind-drift (heat-drift). Alternatively, this can also be accomplished by subjecting a heat roller and an infrared ray heater to divided control, so that both side edge portions, which tend to become a low temperature, can be heated.

The conveyance tension (the value of a tension divided by a cross section of the support) is preferably from 0.001 $kg/mm^2$ to 0.05 $kg/mm^2$, more preferably from 0.003 $kg/mm^2$ to 0.03 $kg/mm^2$, and further preferably from 0.007 $kg/mm^2$ to 0.02 $kg/mm^2$. Such a tension can be attained by regulating a motor that is set at any one or both of a winding side and a forwarding side. At this time, preferably a tension-pickup should be set, to thereby adjust the tension, while monitoring the same.

Such a conveying heat treatment may be performed by a roll conveyance, or alternatively by a noncontact conveyance (an air floating conveyance). The former, by which a higher flatness can be easily attained, is preferred.

When the heat-treated support is rapidly cooled, wrinkle easily occurs. Therefore, cooling is carried out with the cooling rate of preferably not more than 5° C./min, and more preferably not more than 3° C./min. Further, it is preferred to wind at high tension after tension-cutting, in order to prevent a failure of winding.

Such a heat treatment under a low tension is preferably applied to a polyester support as it is without any additional treatment after the above-mentioned film-formation. Alternatively, the heat treatment under a low tension is also preferably applied to the polyester support that has already been subjected to a surface treatment (a glow discharge treatment, corona discharge treatment, flame treatment, ultraviolet ray treatment), or additionally to a coating with a coating layer, such as a water-soluble polymer-coating layer (for example, gelatins, water-soluble polyesters), a latex layer (for example, styrene-butadiene rubber, vinylidene chloride, acrylate resins, urethane resins, polyolefins), and an organic solvent-coating layer (for example, cellulose esters, nitro celluloses, urethanes, acrylates, polyolefins). Since these coating layers are accompanied by a drying step, the coefficient of heat shrinkage can be lessened by heat during drying. This is because the coating step is preferred.

Further, these coating layers may contain an anti-static agent (for example, tin oxide, vanadium pentoxide, cationic polymers), a reflection-preventing dye, or a matting agent (for example, silica, alumina, crosslinking polystyrene, crosslinking PMA).

A photographic light-sensitive material of the present invention can be prepared by coating a photographic light-sensitive layer on the thus-obtained support. Preferably, photographic light-sensitive materials as described in, for example, Japanese patent application No. 226699/1997 and JP-A-10-10676 can be used.

The measurement methods used in the present invention are described below.

(1) ΔL, ΔL range

The TMA (Thermal Mechanical Analysis) is carried out under the following conditions.

At the five points of the low-tension heat-treated support divided into five equal parts in the width direction, samples, each having a size of 35 mm in the lengthwise direction (longitudinal direction; MD) and 4 mm in the width direction (TD), are cut off for sampling. After these samples are set, so that the interval of cracks is 25 mm, followed by applying 5.4 g of weight onto the samples, the dimensional change is measured in a nitrogen gas stream, while raising temperature from 25° C. to 200° C. at a rate of 2° C./min. For measurement, a TMA analyzing apparatus (for example, model 2200, manufactured by TA instrument Company) is employed.

The size (dimensions) at 30° C. and the size (dimensions) at 150° C. are measured at each of the measuring points, to obtain ΔL (%) in accordance with the following formula. An average value is indicated as the ΔL (%). A difference between the maximum value and the minimum value is defined as the ΔL range (%).

ΔL (%)=100×[(the longitudinal direction size at 150° C.)−(the longitudinal direction size at 30° C.)]/(the longitudinal direction size at 30° C.)

(2) The amount of the slackening in the middle of the support

As shown in FIG. 1, the low-tension heat-treated support, having a size of 5 m in the MD direction, is sampled in parallel with the width direction. Both side edges of this sample are fixed to two rolls (A roll and B roll), in parallel at intervals of 5 m. The A roll is fixed, and a prescribed weight (5 kg/1 m width) is applied to the B roll, which is freely rotatable, to thereby tension the support. A length.. loosened beneath a plane surface linking the rolls in parallel is measured, to obtain the maximum length (A). Similarly, the maximum length (B) is measured with respect to the support prior to the low-tension heat treatment. The absolute value of the difference between A and B (A–B) is defined as an amount of the slackening in the middle of the support. In FIG. 1, 1 and 2 each show parallel rolls A and B, 3 shows a weight, and 4 shows a sample support.

(3) The height of the undulation

A low-tension heat-treated support is spread on a horizontal and flat table having a width wider than that of the support, and a length of 2 m or longer. The height of undulation at both side edges (the distance between the undulation and the table) is measured along the length of 2 m, using slide calipers. The maximum value thereof is defined as the height of the undulation.

(4) 120° C. heat shrinking ratio

[1] The MD direction

The low-tension heat-treated support is cut to the size of 25 cm in the lengthwise direction (MD) and 5 cm in the width direction (TD). To the sample described above, two holes, with an interval of 20 cm, are formed. After humidifying the sample at 25° C. and 60% RH for not less than 12 hours, the distance between the 2 holes is measured using a pin gauge (the length is defined as $L_1$). Thereafter, the sample is pressed, for 30 seconds, onto a flat stainless plate heated to 120° C. and having a thickness of 10 mm. Thereafter, the sample is humidified at 25° C. and 60% RH for not less than 12 hours, and then the distance between the holes is measured again using a pin gauge (the length is defined as $L_2$). The thermal dimensional changing ratio is obtained based on the following formula.

$$120^\circ\text{ C. heat shrinking ratio (\%)}=[100\times(L_2-L_1)/L_1]$$

The thermal dimensional changing ratio is measured at the 5 points of the support equally divided in the width direction, and the observed values are averaged. The thus-obtained average value is defined as the 120° C. heat shrinking ratio in the MD direction. The absolute value of the difference between the maximum value and the minimum value at the 5 points is defined as the 120° C. heat shrinking ratio range.

[2] The TD direction

The low-tension heat-treated support is cut to the size of 25 cm in the width direction (TD) and 5 cm in the lengthwise direction (MD). Measurement is carried out in the same manner as the MD direction, except for employing the above-mentioned sample.

(5) Tension p A differential trans-type tension test machine (for example, LX-TC-100, trade name, manufactured by Mitsubishi Electric Corporation) is disposed to the rolls at just before the heat treatment zone and at just after the heat treatment zone. The tension at 25° C. is measured and the average value thereof is obtained.

According to the present invention, polyester supports having excellent flatness and thermal dimensional stability are obtained.

The present invention will be described in more detail with reference to the following Examples, but the invention should not be construed as being limited thereto.

EXAMPLES

Example-1

(1) Preparation of support:

(1-1) Preparation of polyethylene terephthalate (PET) support:

Using terephthalic acid and ethylene glycol, PET of intrinsic viscosity of 0.66 (measured in phenol/tetrachloroethane=6/4 (weight ratio) at 25° C.) was obtained according to a usual manner. After forming pellets from the PET and drying at 130° C. for 4 hours, the pellets were extruded from a T-type die after melting at 300° C., onto an electrostatically impressed casting drum at 50° C., to provide an unstretched film of a thickness that would become 120 μm after thermal fixing.

The film was longitudinally stretched by 3.3 times using rolls that each had a different peripheral speed; then width-direction-stretching by 4.5 times was performed by a tenter, and the temperatures in this case were 110° C. and 130° C., respectively. Thereafter, after thermally fixing at 240° C. for 20 seconds, the sample film was mitigated (relaxed) by 4% to the width direction at the same temperature. Thereafter, after slitting the chuck portion of the tenter, knurling (10 μm in thickness and 1 cm in width) was carried out in both edges of the support. Thus, PET supports having widths (film-formation width) of 1.5 m, 2.5 m, and 6.0 m were obtained, respectively.

(1-2) Preparation of polyethylene-2,6-naphthalate (PEN) support:

Using naphthalene-2,6-dicarboxylic acid dimethyl ester and ethylene glycol, PEN of IV=0.58 (measured in phenol/tetra-chloroethane=6/4 (weight ratio) at 25° C.) was obtained according to a usual manner. After forming pellets from the PEN and drying at 150° C. for 4 hours, the pellets were extruded from T-type die after melting at 320° C., onto an electrostatistically impressed casting drum at 50° C., to provide an unstretched film of a thickness that would become 120 μm after thermal fixing.

The film was longitudinally stretched by 2.8 times using rolls that each had a different peripheral speed; then width-direction-stretching by 3.7 times was performed by a tenter, and the temperatures in this case were 140° C. and 150° C., respectively. Thereafter, after thermally fixing at 250° C. for 20 seconds, the sample film was mitigated by 4% to the width direction at the same temperature. Thereafter, after slitting the chuck portion of the tenter, knurl working was applied to both edge portions on the scale of a thickness of 10 μm and a width of 1 cm. Thus, a PEN support having a width (film-formation width) of 2.5 m was obtained.

(2) Preparation of coated layers:

On one surface of the supports described above, after surface-treatment, were formed first and second undercoating layers (subbing layers), and on the other surface thereof, were formed first and second backing layers.

(2-1) Corona discharge treatment

Prior to coating, corona discharging (using a solid state corona discharging machine, Model 6 KVA, trade name, manufactured by Piller Co., both surfaces of a support were treated under room temperature at 20 meters/minute) was applied to both of the surfaces of the support to be coated. From the read values of the electric current and the voltage in this case, it was confirmed that treatment of 0.375 kV-A-minute/$m^2$ was applied to the support. In this case, the treating frequency was 9.6 kHz, and the gap clearance between the electrode and the dielectric roll was 1.6 mm. Then, the following layer was coated thereon.

(2-2) Undercoating first layer

A water-dispersed latex having the following composition was coated on the support, using a wire bar, at a dry thickness of 0.3 μm, followed by drying at 120° C. for 2 minutes.

Butadiene-styrene copolymer latex (solid component 43%, butadiene/styrene (weight ratio)=32/68) 13 ml 2,4-Dichloro-6-hydroxy-s-triazine sodium salt 8% aqueous solution 7 ml Sodium laurylbenzenesulfonate 1% aqueous solution 1.6 ml Distilled water 80 ml (2-3) Undercoating second layer An aqueous solution having the following composition was coated, using a wire bar, at a dry thickness of 0.14 μm. The presence or absence of the coated layer and the drying conditions are shown in Table 1.

Gelatin 0.9 g

Methylcellulose (Metolose SM15, trade name, of a substitution degree 1.79 to 1.83) 0.1 g Acetic acid (concentration 99%) 0.02 ml Distilled water 99 ml (2-4) Backing first layer (electrically conductive layer)

An acrylic latex water-dispersed liquid of the following composition containing an electrically conductive material was coated, at a dry thickness that would become 0.2 μm, and dried at 180° C. for 30 seconds, to prepare a support having a surface electric resistance of $10^6 \Omega$.

Acrylic resin aqueous dispersion (Jurymer ET410, trade name, solid component 20 wt. %, made by Nihon Junyaku K.K.) 2.0 wt. parts Tin oxide-antimony oxide aqueous dispersion (average particle size 0.1 μm, 17 wt. %) 18.1 wt. parts Polyoxyethylene phenyl ether 0.1 wt. parts Silica particles (average particle size 3 μm) 0.2 wt. parts Distilled water to make 100 wt. parts (2-5) Backing second coated layer (polyolefin slippery layer)

A polyolefin latex water-dispersed liquid of the following composition was coated, at a dry thickness that would become 0.1 μm, and dried at 180° C. for 30 seconds.

Polyolefin (Chemical s-120, 27 wt. %, trade name, made by Mitsui Petrochemical Industries, Ltd.) 3.0 wt. parts Colloidal silica (Snow Tex C, trade name, made by Nissan Chemical Industries, Ltd.) 2.0 wt. parts Epoxy compound (Denacol EX-614B, trade name, made by Nagase Kasei K.K.) 0.3 wt. parts Distilled water to make 100 wt. parts in total (3) Slit After coating the subbing layers and the backing layers, the supports were slit so that the offset amount and the width would become the values shown in Table 1. Knurling (10 mm in width and 10 μm in height) was carried out in both edges of the slit support.

TABLE 1

Conditions from film-production to heat-treatment

| | Support | | Slit | | Heat treatment | | |
|---|---|---|---|---|---|---|---|
| | Material | Width m | Width m | Offset amount % | Temperature ° C. | Time sec. | Tension kg/mm$^2$ |
| This invention 1 | PET | 2.5 | 1.3 | 16 | 180 | 45 | 0.015 |
| This invention 2 | PET | 2.5 | 0.7 | 36 | 180 | 45 | 0.015 |
| This invention 3 | PET | 2.5 | 2.0 | 6 | 180 | 45 | 0.015 |
| This invention 4 | PET | 2.5 | 1.0 | 25 | 145 | 45 | 0.025 |

TABLE 1-continued

Conditions from film-production to heat-treatment

| | Support | | Slit | | Heat treatment | | |
|---|---|---|---|---|---|---|---|
| | Material | Width m | Width m | Offset amount % | Temperature ° C. | Time sec. | Tension kg/mm$^2$ |
| This invention 5 | PET | 2.5 | 1.0 | 10 | 160 | 100 | 0.005 |
| This invention 6 | PET | 1.5 | 0.8 | 18 | 160 | 85 | 0.015 |
| This invention 7 | PET | 6.0 | 2.5 | 30 | 180 | 15 | 0.007 |
| This invention 8 | PEN | 2.5 | 1.0 | 10 | 180 | 30 | 0.010 |
| Comparative example 1 | PET | 2.5 | 1.0 | 0 | 180 | 45 | 0.015 |
| Comparative example 2 | PET | 2.5 | 1.0 | 3 | 210 | 300 | 0.015 |
| Comparative example 3 | PET | 2.5 | 1.0 | 0 | 100 | 45 | 0.015 |

(4) Low-tension heat treatment

A low-tension heat treatment was applied to the slit support under the condition shown in Table 1.

(5) Evaluation

After the low-tension heat treatment, the following evaluations were carried out, and the results are shown in Table 2. The supports of the present invention showed excellent results in terms of flatness, dimensional stability, and light permeability.

[1] Flatness index

The values were calculated using ΔL and ΔL range, both of which were obtained by the above-described method.

[2] 120° C. heat shrinking ratio, range

The values were obtained by the above-described method.

[3] Amount of slackening in the middle and height of undulation

The values were obtained by the above-described method.

[4] Increase rate of light transmittance

Light transmittance (%) of the support at 400 nm before the heat treatment and after the heat treatment was measured, respectively. The difference between them is defined as the increase of light transmittance (%).

TABLE 2

Evaluation of supports after heat treatment

| | Flatness | | | Height of | Amount of slackening | 120° C. heat shrinkage rate | | | | Increase rate |
|---|---|---|---|---|---|---|---|---|---|---|
| | | | | | | Average | | Range | | of light |
| | Δ L % | Δ L range % | Flatness index | undulation mm | in the middle mm | MD % | TD % | MD % | TD % | transmittance % |
| This invention 1 | 0.41 | 0.08 | 0.033 | 0.1 | 2 | −0.005 | +0.015 | 0.002 | 0.005 | 0 |
| This invention 2 | 0.48 | 0.14 | 0.067 | 23 | 45 | −0.015 | +0.025 | 0.020 | 0.015 | 0 |
| This invention 3 | 0.45 | 0.13 | 0.059 | 18 | 36 | −0.010 | +0.020 | 0.015 | 0.010 | 0 |
| This invention 4 | 0.15 | 0.10 | 0.015 | 3 | 7 | −0.045 | +0.040 | 0.025 | 0.020 | 0 |
| This invention 5 | 0.52 | 0.06 | 0.031 | 0 | 0 | 0 | +0.005 | 0.001 | 0.001 | 0 |
| This invention 6 | 0.43 | 0.06 | 0.026 | 0 | 0 | −0.002 | +0.008 | 0.001 | 0.001 | 0 |
| This invention 7 | 0.37 | 0.12 | 0.044 | 0.3 | 4 | −0.008 | +0.022 | 0.004 | 0.007 | 0.1 |
| This invention 8 | 0.43 | 0.11 | 0.047 | 0.7 | 3 | −0.006 | +0.011 | 0.005 | 0.007 | 0.2 |
| Comparative example 1 | 0.39 | 0.19 | 0.074 | 32 | 53 | −0.030 | +0.035 | 0.035 | 0.038 | 0 |
| Comparative example 2 | 0.55 | 0.001 | 0.006 | 0.1 | 2 | −0.006 | +0.016 | 0.002 | 0.004 | 3.8 |
| Comparative example 3 | 0.11 | 0.04 | 0.004 | 39 | 58 | −0.056 | +0.047 | 0.025 | 0.031 | 0 |

(6) Preparation of a light-sensitive material

An SBR-series light-sensitive layer described below was coated on the subbing side of the low-tension heat-treated support coating thereon the above-described subbing layers and the backing layers.

(Preparation of silver halide grains A)

22 g of a phthalated gelatin and 30 mg of potassium bromide were dissolved in 700 ml of water. After adjustment of the pH to 5.0 at 40° C., 159 ml of an aqueous solution containing 18.6 g of silver nitrate, and an aqueous solution containing potassium bromide, were added to the resulting solution over 10 minutes according to the controlled double jet method, while maintaining a pAg of 7.7. Further, an aqueous solution containing $8\times10^{-6}$ mol/l of $K_3[IrCl_6]^{3-}$ and 1 mol/l of potassium bromide was added thereto over 30 minutes according to the controlled double jet method, while maintaining a pAg of 7.7. Thereafter, the pH and the pAg were adjusted to 5.9 and 8.0, respectively.

The thus-obtained silver halide grains were cubic grains having an average grain size of 0.07 μm, a deviation coefficient of 8% in terms of a projected area diameter, and a (100) area ratio of 86%.

The above-described silver halide grains C were warmed to the temperature of 60° C. To the warmed grains, were added $8.5\times10^{-5}$ mol of sodium thiosulfate, $1.1\times10^{-5}$ mol of 2,3,4,5,6-pentafluorophenyldiphenylsulfinselenide, $2\times10^{-6}$ mol of tellurium compound-1, $3.3\times10^{-6}$ mol of chloroauric acid, and $2.3\times10^{-4}$ mol of thiocyanic acid, per mol of silver, respectively, and then the mixture was allowed to ripen for 120 minutes. Thereafter, $8\times10^{-4}$ mol of the sensitizing dye-C was added to the mixture, with stirring, after the temperature was cooled to 50° C., followed by addition of $3.5\times10^{-2}$ mol of potassium iodide. After the resultant mixture was stirred for 30 minutes, it was rapidly cooled to 30° C., to finish preparation of the silver halide.

Sensitizing dye - C

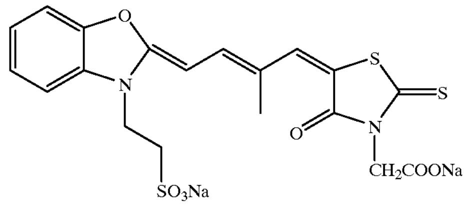

Tellurium compound - 1

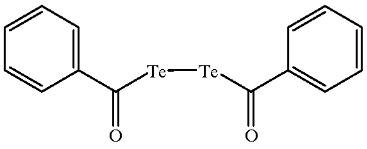

(Preparation of dispersions of fine crystals of a silver salt of an organic acid)

40 g of behenic acid, 7.3 g of stearic acid, and 500 ml of a distilled water were mixed at 90° C. for 15 minutes. 187 ml of a 1N-NaOH aqueous solution was added to the mixture, with vigorous stirring, over 15 minutes, followed by 61 ml of a 1N-nitric acid aqueous solution, and then cooling to 50° C. Thereafter, 124 ml of a 1N-nitric acid aqueous solution was added to the resultant mixture, and they were stirred for 30 minutes. Thereafter, solid contents were separated by filtration under reduced pressure, and then the separated solid contents were washed with water, until the conductivity of the filtrate became 30 μs/cm. The thus-obtained solid contents were used in the form of a wet cake without drying them. 12 g of polyvinyl alcohol and 150 ml of water were added to the wet cake, corresponding to 34.8 g of the dry solid contents, and they were well mixed, to obtain a slurry. 840 g of zirconia beads (average diameter, 0.5 mm) provided and the slurry were placed in a vessel, and they were dispersed for five hours using a dispersing machine (1/4G-sand grinder mill, manufactured by IMEX Co., Ltd.), to obtain a dispersion of fine crystals of a silver salt of an organic acid having a volume weighted average size of 1.5 μm. Measurement of the average grain size was carried out using a Master Saizer X, trade name, manufactured by Malvern Instruments Ltd.

(Preparation of dispersions of solid material fine particles)

Dispersions of solid fine particles of tetrachlorophthalic acid, 4-methylphthalic acid, 1,1-bis(2-hydroxy-3,5-dimethylphenyl)-3,5,5-trimethylhexane, phthalazine, and tribromomethylsulfonylbenzene were prepared, respectively.

0.81 g of hydroxypropyl cellulose and 94.2 ml of water were added to tetrachlorophthalic acid. The resultant mixture was well stirred, to make a slurry, and the slurry was allowed to stand for 10 hours. Thereafter, the slurry and 100 ml of zirconia beads (average diameter, 0.5 mm) were placed in a vessel and dispersed for five hours, using a dispersing machine of the same type used to prepare the dispersion of fine crystals of a silver salt of an organic acid, to obtain a dispersion of tetrachlorophthalic acid solid fine crystals. 70 wt % of the solid fine particles had a particle size of 1.0 μm.

(Preparation of a coating solution for a photographic emulsion layer)

The following composition was added to the previously prepared dispersion of fine crystals of a silver salt of an organic acid, to prepare a coating solution for a photographic emulsion layer.

Dispersion of fine crystals of a silver salt of an organic acid 1 mol

Halogen particles A 0.05 mol

Binder, SBR latex (LACSTAR 3307B, trade name, manufactured by Dainippon Ink and Chemicals, Incorporated) 430 g Material for Development: Tetrachlorophthalic acid 5 g 1,1-Bis(2-hydroxy-3,5-dimethylphenyl)-3,5,5-trimethylhexane 98 g Phthalazine 9.2 g Tribromomethylphenol sulfone 12 g 4-Methylphtharic acid 7 g Hydrazine nucleating agent $5.0\times10^{-3}$ mol/Ag 1 mol (Preparation of a coating solution for an emulsion-protective layer)

The following composition was added to an inert gelatin, to prepare a coating solution for the emulsion-protective layer.

Inert gelatin 10 g

Surfactant A 0.26 g

Surfactant B 0.09 g 1,2-(Bisvinylsulfoneacetamide)ethane 0.3 g

Water 64 g

Hydrazine nucleating agent

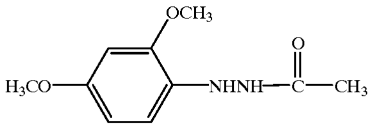

Surfactant A

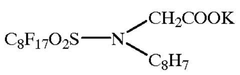

-continued

Surfactant B

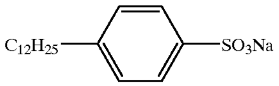

(Coating of a light-sensitive layer)

The thus-prepared coating solution for the photographic emulsion layer was coated on a polyethylene terephthalate support, so that a coating amount became 1.6 g/$m^2$ in terms of silver. Further, a coating solution for the emulsion-protective layer was coated on the photographic emulsion layer, in a coating amount of 1.8 g/$m^2$ in terms of gelatin.

The flatness (the height of undulation and the amount of slackening in the middle) and the 120° C. heat shrinkage (an average value and a range) of the thus-prepared light-sensitive material were measured, according to the above-described methods. The light-sensitive material, cut to A2 size, was exposed to xenon flash light of $10^{-4}$ second emission time, through a half tone dot test pattern, for printing, followed by development at 120° C. for 30 seconds using a heat-developing apparatus described in JP-T-505488 ("JP-T" means a published searched patent publication). The thus-prepared test pattern was printed to a pre-sensitized printing plate (PS plate), and the handling properties were evaluated using the PS plate. The term "print blur" herein used means phenomena that, because the base comes up, contact exposure is difficult to apply thereto, and therefore failure of focus (out of focus) occurs, which results in half tone dots becoming fuzzy and getting close to each other. The print blur is evaluated by examining the presence (or absence) of the failure of focus with the naked eye using a loupe.

The term "shear in printing" is evaluated by examining, with the naked eye using a loupe, whether the marks labeled respectively on both long side edges of the A2 size original plate are shifted, when multiple printing is performed.

The photographic supports of the present invention provided excellent flatness and dimensional stability, and thereby excellent printing was performed. Further, reduction of printing sensitivity did not occur. In contrast, the flatness of the photographic supports for comparison in Comparative examples was inferior, such that print blur, shear in printing due to the dimensional change, and reduction in printing sensitivity occurred.

TABLE 3

| | Evaluation of light-sensitive materials | | | | | | | | |
|---|---|---|---|---|---|---|---|---|---|
| | Flatness | | | | | | | | |
| | Height of undulation mm | Amount of slackening in the middle mm | 120° C. heat shrinkage rate Average MD % | TD % | Range MD % | TD % | Handling properties Print blur | Shear in printing | Reduction in printing sensitivity |
| This invention 1 | 0.2 | 3 | −0.003 | +0.012 | 0.002 | 0.004 | none | none | none |
| This invention 2 | 25 | 46 | −0.012 | +0.023 | 0.021 | 0.013 | none | none | none |
| This invention 3 | 19 | 38 | −0.010 | +0.018 | 0.016 | 0.009 | none | none | none |
| This invention 4 | 4 | 8 | −0.041 | +0.038 | 0.023 | 0.020 | none | none | none |
| This invention 5 | 0 | 0 | 0 | +0.004 | 0.001 | 0.001 | none | none | none |
| This invention 6 | 0 | 0 | −0.001 | +0.007 | 0.000 | 0.000 | none | none | none |
| This invention 7 | 0.3 | 5 | −0.006 | +0.020 | 0.002 | 0.006 | none | none | none |
| This invention 8 | 0.8 | 3 | −0.004 | +0.010 | 0.004 | 0.006 | none | none | none |
| Comparative example 1 | 33 | 54 | −0.030 | +0.033 | 0.033 | 0.035 | presence | presence | none |
| Comparative example 2 | 0.2 | 3 | −0.005 | +0.016 | 0.002 | 0.002 | none | none | presence |
| Comparative example 3 | 39 | 58 | −0.054 | +0.044 | 0.023 | 0.030 | presence | presence | none |

Having described our invention as related to the present embodiments, it is our intention that the invention not be limited by any of the details of the description, unless otherwise specified, but rather be construed broadly within its spirit and scope as set out in the accompanying claims.

What I claim is:

1. A polyester support, which has a flatness index of from 0.01 to 0.07, which is defined by the following formula:

Flatness index=(the average value of ΔL in the transverse direction)×(ΔL range)

in which

ΔL (%)=100×[(longitudinal direction size at 150° C.)−(longitudinal direction size at 30° C.)]/(longitudinal direction size at 30° C.), and ΔL range (%)=[(maximum value of ΔL in the transverse direction)−(minimum value of ΔL in the transverse direction).

2. The polyester support as claimed in claim 1, wherein ΔL as defined by the formula described below, is from 0.1% to 0.6%:

ΔL (%)=100×[(longitudinal direction size at 150° C.)−(longitudinal direction size at 30° C.)]/(longitudinal direction size at 30° C.).

3. The polyester support as claimed in claim 1, wherein the height of undulation is from 0 mm to 25 mm.

4. The polyester support as claimed in claim 1, wherein the amount of a slackening in the middle of the support is from 0 mm to 50 mm.

5. The polyester support as claimed in claim 1, wherein the percentage of thermal dimensional change at 120° C. is from −0.05% to 0.05%, both in the longitudinal direction and in the transverse direction.

6. The polyester support as claimed in claim 1, wherein a difference (range) between the maximum value and the minimum value obtained by measuring, in the transverse direction, the percentage of thermal dimensional change at 120° C., both in the longitudinal direction and in the transverse direction, is from 0% to 0.03%, both in the longitudinal direction and in the transverse direction.

7. The polyester support as claimed in claim 1, wherein the polyester is made of polyethylene terephthalate.

8. The polyester support as claimed in claim 1, which is produced with the offset amount as defined by the formula described below, being 3 to 45%:

Offset amount (%)=100×(a distance between the film-formation center and the heat treatment center)/(a width of the film-formation raw film).

9. The polyester support as claimed in claim 1, wherein the polyester is made of polyethylene naphthalate.

10. A silver halide photographic light-sensitive material, comprising a polyester support, which has a flatness index of from 0.01 to 0.07, which is defined by the following formula:

Flatness index=(the average value of ΔL in the transverse direction)×(ΔL range)

in which

ΔL (%)=100×[(longitudinal direction size at 150° C.)−(longitudinal direction size at 30° C.)]/(longitudinal direction size at 30° C.), and ΔL range (%)=[(maximum value of ΔL in the transverse direction)−(minimum value of ΔL in the transverse direction).

11. The silver halide photographic light-sensitive material as claimed in claim 10, wherein ΔL as defined by the formula described below, is from 0.1% to 0.6%:

ΔL (%)=100×[(longitudinal direction size at 150° C.)−(longitudinal direction size at 30° C.)]/(longitudinal direction size at 30° C.).

12. The silver halide photographic light-sensitive material as claimed in claim 10, wherein the height of undulation is from 0 mm to 25 mm.

13. The silver halide photographic light-sensitive material as claimed in claim 10, wherein the amount of a slackening in the middle of the support is from 0 mm to 50 mm.

14. The silver halide photographic light-sensitive material as claimed in claim 10, wherein the percentage of thermal dimensional change at 120° C. is from −0.05% to 0.05%, both in the longitudinal direction and in the transverse direction.

15. The silver halide photographic light-sensitive material as claimed in claim 10, wherein a difference (range) between the maximum value and the minimum value obtained by measuring, in the transverse direction, the percentage of thermal dimensional change at 120° C., both in the longitudinal direction and in the transverse direction, is from 0% to 0.03%, both in the longitudinal direction and in the transverse direction.

16. The silver halide photographic light-sensitive material as claimed in claim 10, wherein the polyester is made of polyethylene terephthalate.

17. The silver halide photographic light-sensitive material as claimed in claim 10, wherein the polyester support is produced with the offset amount as defined by the formula described below, being 3 to 45%:

Offset amount (%)=100×(a distance between the film-formation center and the heat treatment center)/(a width of the film-formation raw film).

18. The silver halide photographic light-sensitive material as claimed in claim 10, wherein the polyester is made of polyethylene naphthalate.

* * * * *